United States Patent

[11] 3,545,569

| [72] | Inventor | John Forster Alcock<br>Lancing, Sussex, England |
|---|---|---|
| [21] | Appl. No. | 752,967 |
| [22] | Filed | Aug. 15, 1968 |
| [45] | Patented | Dec. 8, 1970 |
| [73] | Assignee | Ricardo & Co., Engineers Ltd.<br>Shoreham-by-sea, Sussex, England |
| [32] | Priority | Aug. 16, 1967 |
| [33] | | Great Britain |
| [31] | | No. 37812/67 |

[54] LUBRICATION OF BEARINGS OF RECIPROCATING ENGINES OR PUMPS
2 Claims, 4 Drawing Figs.

[52] U.S. Cl............................................... 184/6,
123/196; 184/24
[51] Int. Cl................................................. F01m 1/06
[50] Field of Search............................................ 184/24, 26,
6(Y). 6(N) (Consulted); 103/206; 74/587 (Consulted). 589.
123/196(M). 196(V)

[56] References Cited
UNITED STATES PATENTS

| 1,020,774 | 3/1912 | Nilson.......................... | 184/6 |
| 2,899,016 | 8/1959 | Swayze........................ | 184/6 |
| 3,165,172 | 1/1965 | Baker........................... | 184/24X |

FOREIGN PATENTS

| 274,058 | 6/1951 | Switzerland................. | 184/6 |

*Primary Examiner*—Manuel A. Antonakas
*Attorney*—Watson, Cole, Grindle and Watson ABSTRACT: A reciprocating piston mechanism in which the piston or piston rod is pivotally connected by a small end bearing to an angularly oscillating connecting rod and which includes a displacement-type lubricating pump actuated independently of the oscillation of the connecting rod by the reciprocating movement of the piston or piston rod to deliver a timed feed of lubricant under pressure to the bearing during a selected portion of the reciprocating cycle.

LUBRICATION OF BEARINGS OF RECIPROCATING ENGINES OR PUMPS

This invention relates to reciprocating piston mechanism such as reciprocating engines or pumps, which term is used to include compressors for gaseous fluids, and is concerned with the lubrication of the small end bearings of such mechanisms that is to say the bearing by which the connecting rods are connected to the piston or piston rods, e.g. in the latter case via a crosshead.

In some arrangements the connection between a piston or piston rod and a connecting rod is by a single bearing while in other cases it is by two axially spaced bearings and for convenience herein the bearing assembly will in each case be referred to simply as a small end bearing.

Where, as with a small end bearing of a single-acting reciprocating internal combustion engines operating on the two-stroke cycle, or a small end bearing associated with the piston of a pump operating in a cylinder to which the working fluid is delivered under pressure, (e.g. by an earlier stage of the pump as a whole) the load on the small end bearing, though varying, is, at least over a large proportion of the range of working conditions, continuously in one direction, difficulty arises in maintaining an adequate lubricant film between the working surfaces of the bearing, the rubbing velocity being too low for a hydrodynamic film of sufficient thickness to be formed while the absence of load reversal prevents lubricant being sucked into the substantially continuously loaded area of the working clearance or being forced into this area of the clearance by the comparatively low oil pressure of a normal force-feed lubricating system. Moreover the provision of a continuous oil feed to such a small end bearing at a sufficiently high pressure to force the continuously loaded area of the baring surfaces apart, even during the period of relatively low loading, would involve excessive leakages at the ends of the bearing clearance and other practical inconvenience due, for example, to the fact that the high pressure oil delivery would also necessarily include relatively moving parts the connection between which would have to be adequately sealed against leakage at the high pressure in question.

A known method of overcoming this difficulty is to provide, in association with each small end bearing between a connecting rod and a crosshead of a reciprocating internal combustion engine a reciprocating oil pump which delivers to the substantially continuously loaded area of the bearing a "shot" of lubricant at high pressure during a short period a little before each period of maximum bearing loading, so that the substantially continuously loaded faces are forced apart and an oil film thus provided too thick to be completely squeezed out during the high load period, this pump being mounted upon the crosshead and its plunger or plungers being actuated through appropriate mechanism acted upon by the connecting rod so as to be operated by its oscillating movement on the crosshead pin. Since the high pressure delivery thus provided can be of short duration the end leakage from the bearing is tolerable. Such arrangements, however, have disadvantages in that if the engine is reversible (for example a reversible marine engine) and the best period for delivery is to be used for each direction of rotation, two pumps are required, while in the known arrangement the nominally idle pump—i.e., the "astern" pump when going ahead and the "ahead" pump when going astern, is delivering during the period of maximum load, which may be of the order of 2,500 pounds per square inch and this puts a heavy load on its operating mechanism which itself needs lubrication and tends to be complex.

It is an object of the present invention to provide a form of lubricating apparatus for the small end bearing of a reciprocating piston mechanism such as a reciprocating single-acting internal combustion engine operating on the two-stroke cycle, or for a reciprocating pump in which, for example, for the reasons given above, the small end bearing or bearings are subject to a substantially continuous load in one direction, which will not be subject to the above drawbacks.

According to the present invention a reciprocating piston mechanism in which the piston or piston rod is pivotally connected by a small end bearing to an angularly oscillating connecting rod includes a displacement-type lubricating pump actuated independently of the oscillation of the connecting rod by the reciprocating movement of the piston or piston rod to deliver a timed feed of lubricant under pressure to the bearing during a selected portion of the reciprocating cycle.

In one construction the reciprocating mechanism is a reciprocating engine or pump, the lubricating pump being arranged to deliver lubricant to the bearing during the instroke of the piston. Conveniently the lubricating pump is carried by the piston or, where there is a piston rod, by the piston rod or a crosshead to which it is connected.

The lubricating pump may be single acting and arranged to be actuated by a walking pipe which also serves as the supply passage from which the pump receives, during each suction period, the lubricant to be delivered by it during the next delivery period. The term "walking pipe" is used in its normal sense to mean a pipe comprising two parts pivotally connected to one another at an intermediate point or knee joint in the length of the pipe as a whole, while the ends of the pipe are pivotally connected respectively to the piston or piston rod, e.g., via the pin of a crosshead, and to a fixed point in the mechanism by joints usually of the banjo type, across which lubricant can flow. Thus, in this case the lubricating pump, which may conveniently be a reciprocating pump may have its plunger connected by a link to an adjacent end of the walking pipe at a point radially displaced from the axis of the pivotal joint connecting such end to the piston or piston rod.

In an alternative arrangement, in which the lubricating pump may also conveniently be of the reciprocating type, it is actuated by a stationary cam extending in the direction of movement of the piston or piston rod and a follower carried by the piston or the piston rod and bearing on the cam and connecting directly or indirectly on the displacement member of the pump. Thus, in such an arrangement where the lubricating pump is a reciprocating pump, its plunger may be disposed with its axis at right angles to the direction of movement of the piston or piston rod and urged by a spring towards the cam while the follower is directly connected to the plunger of the pump. Moreover, in such an arrangement the inlet passage of the reciprocating pump may be supplied with lubricant through a telescopic lubricant supply pipe, the two telescopic parts of which are respectively connected to the piston or piston rod and a part fixed with respect to the mechanism.

In either of the above arrangements the lubricating pump may be arranged to draw lubricant from a supply pipe which is also arranged to supply lubricant via the small end bearing and a passage in the connecting rod to an associated big-end bearing and crosshead slipper of the engine or pump.

Two arrangements according to the invention are shown somewhat diagrammatically by way of example in the accompanying drawings, each as applied to the piston rod and connecting rod assembly of a single-acting two-stroke cycle reciprocating diesel engine of a type employed for marine propulsion and for other uses where a large engine operating at comparatively low speeds is required.

Figure 1:
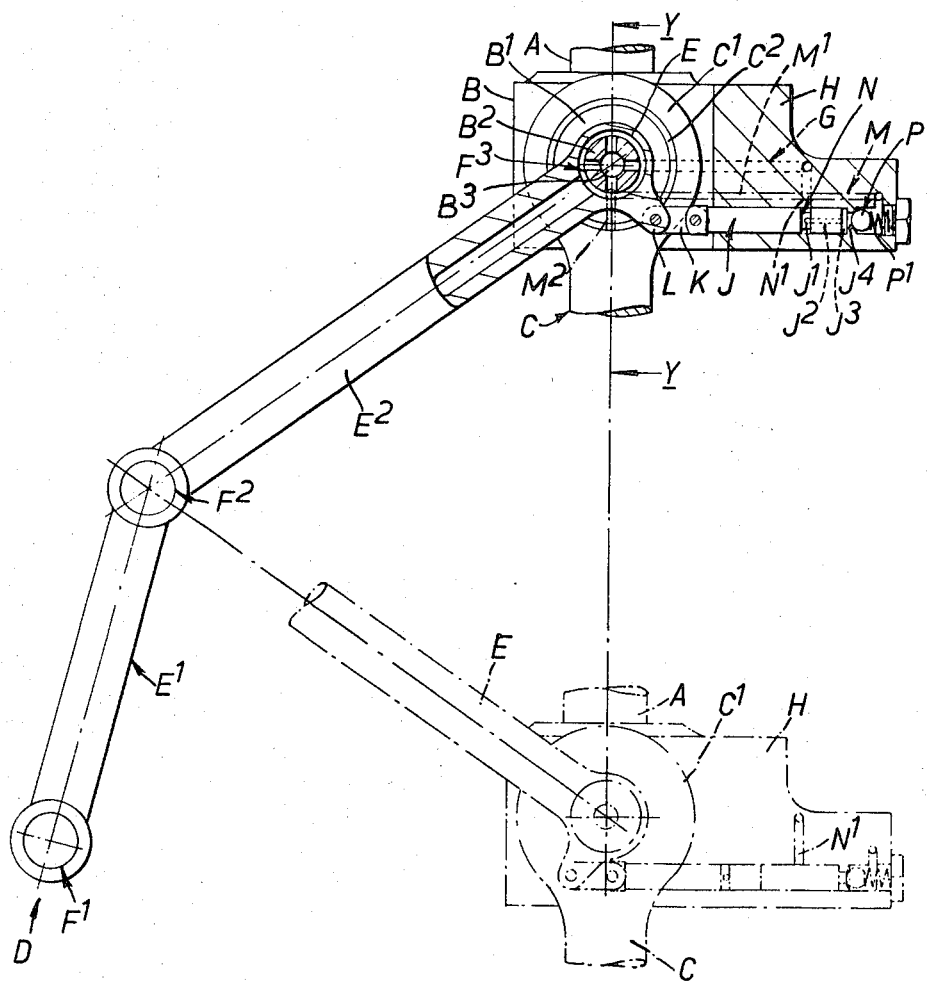
FIG. 1 is a somewhat diagrammatic view in side elevation of one construction according to the invention partly in cross section, the cross section being taken on the line X–X of FIG. 2.
Figure 2:
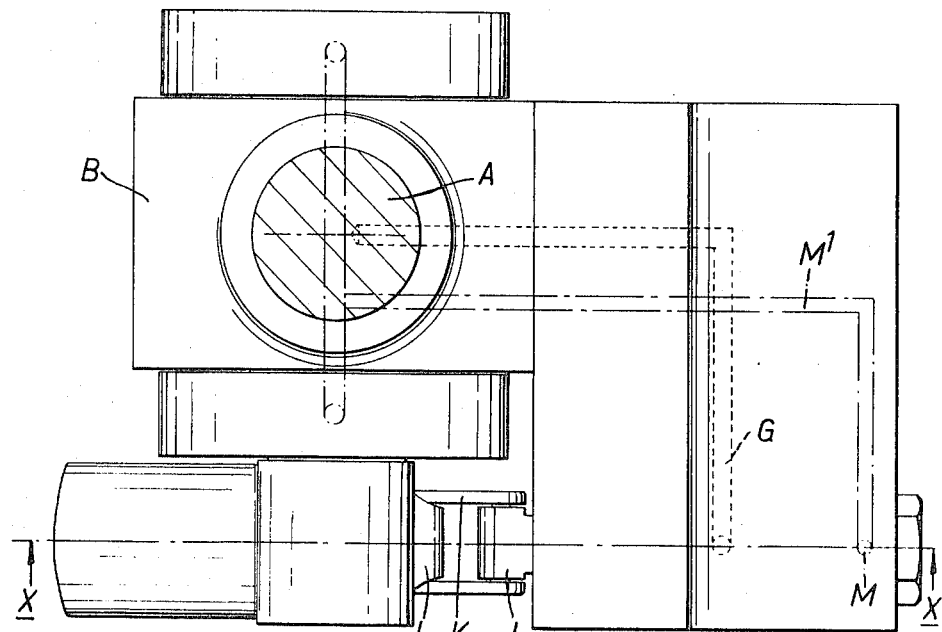
FIG. 2 is a plan view of the arrangement shown in FIG. 1 with part of the walking pipe omitted.
Figure 3:
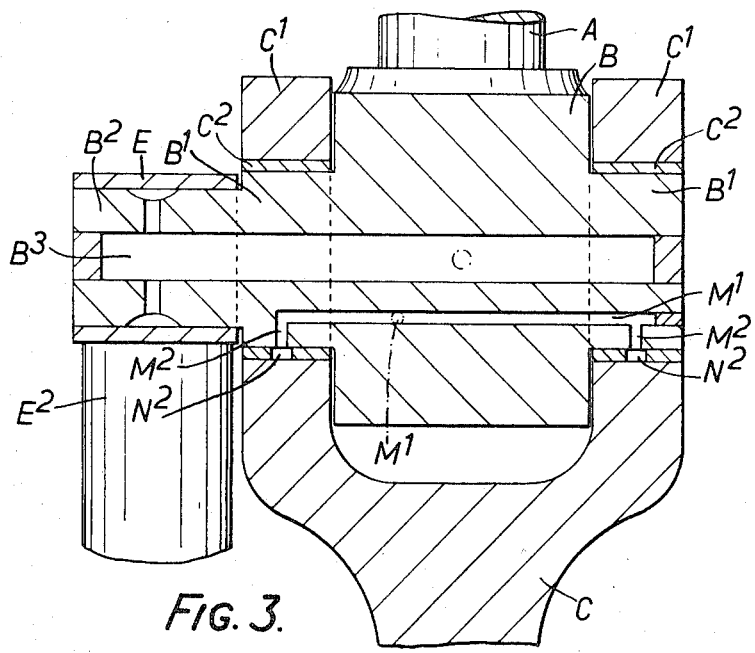
FIG. 3 is a cross section in the plane Y–Y of FIG. 2.

In the construction shown in FIGS. 1, 2 and 3, A is the piston rod of the engine, of which B is the crosshead block provided with two coaxial pins $B^1$ constituting the "crosshead pin". The connecting rod C has a forked small end $C^1$ having secured therein a pair of bearings $C^2$, $C^2$ together constituting the small end bearing. One of the parts of the crosshead pin $B^1$ has a cylindrical projection $B^2$ which is connected by a banjo-type pivotal joint E to one end of a walking pipe the two parts of which are shown respectively at $E^1$ and $E^2$ and are pivotally connected by a banjo-type "knee" joint at $F^2$ while the lower end of the part $E^1$ of the walking pipe being pivotally connected at $F^1$ by a banjo-type joint to a fixed part of the engine. The construction and arrangement of the walking pipe is of usual type so that it serves to deliver oil from a passage communicating with its lower end via the banjo-type joint $F^1$, to a passage $B^3$ extending through the crosshead pin and block B.

The walking pipe thus constitutes a low pressure oil feed to the passage in the crosshead pin.

Secured to the crosshead block B is a pump unit comprising a casing H in which is formed a pump cylinder containing a reciprocating plunger J provided with an annular recess N communicating through a transverse passage $J^1$ and an axial passage $J^2$ with the working chamber $J^3$ of the pump. The plunger J is connected by a link K to a lug L on the part $E^2$ of the walking pipe so that during reciprocation of the crosshead, the pivotal movement of the walking pipe on the projection $B^2$ causes reciprocation of the piston J within its cylinder. At the end of the cylinder is a delivery port controlled by a spring pressed nonreturn valve P while an inlet port $N^1$ communicates with the bore of the cylinder at a point such that it will be uncovered by the piston at the end of its outstroke to permit oil to flow into the working chamber of the pump and will come into communication with the recess N towards the end of the delivery stroke of the pump. The port N communicates by way of the passage G formed partly in the pump casing H and partly in the crosshead pin block B and pin $B^2$ with the passage $B^3$ in the pin crosshead block B and pin $B^1$ while a delivery port $J^4$ communicates by way of the valve P with a delivery chamber $P^1$. The delivery chamber $P^1$ communicates through passages M, $M^1$, $M^2$ with distributing grooves $N^2$ in the two parts of the small end bearing.

The position of the parts at the end of the outstroke of the engine piston is shown in dotted line in FIG. 1.

Thus, during each outstroke of the engine piston the plunger J us moved on its suction stroke from the position shown in full line in FIG. 1 until it uncovers the port $N^1$, whereupon lubricating oil is drawn into the working chamber $J^3$ of the pump by the depression created, while on each instroke of the piston the plunger J returns lubricating oil to the passage G until it covers the port N, after which it delivers lubricating oil through the nonreturn valve P and the passages M, $M^1$, $M^2$, to the substantially continuously loaded areas of the small end bearing until this delivery is terminated when the annular recess N comes into communication with the port $N^1$, i.e., at the position shown in full line in FIG. 1.

Figure 4:
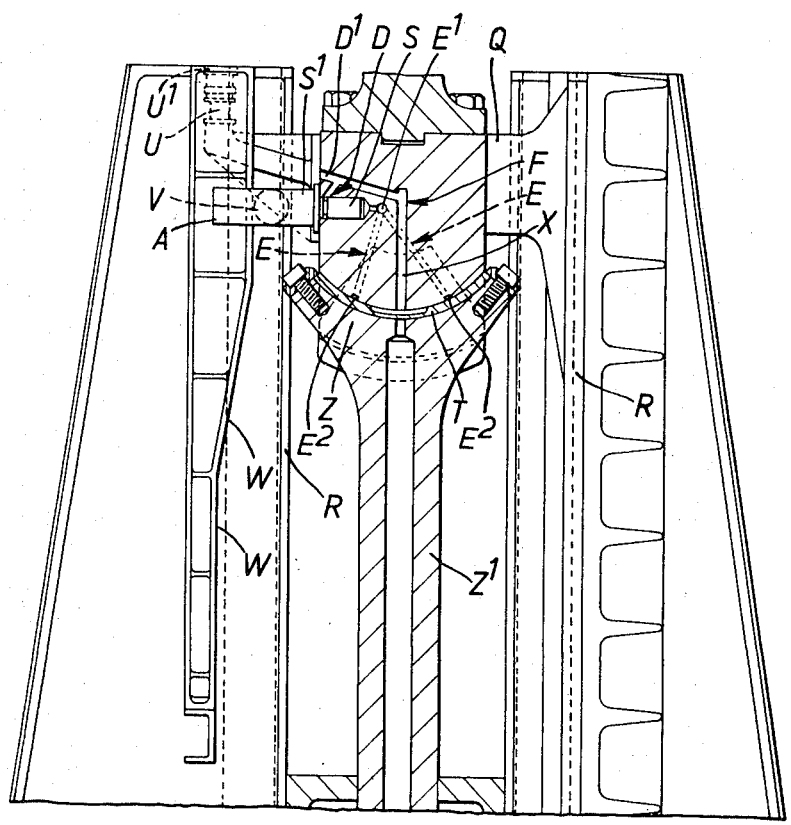
FIG. 4 is a somewhat diagrammatic side elevation of another construction according to the invention.

In the construction shown in FIG. 4 the crosshead block assembly Q, which slides in fixed guides indicated at R, and is connected to the small end Z of a connecting rod $Z^1$, has secured to it a pump block A having formed therein a cylinder in which reciprocates a pump plunger S having its axis at right angles to the direction of movement of the crosshead block. Communicating with the pump cylinder is an inlet passage D and delivery passage S indicated at E, E controlled by a nonreturn valve indicated at $E^1$. The delivery passages E communicate with distributing grooves $E^2$ in the highly loaded part of the working face of the small end bearing T.

The inlet passage D communicates via a supply passage $D^1$ with the lower end of a telescopic oil supply pipe the lower part of which is indicated at U and is secured to the crosshead block Q while the upper part is secured to the engine frame as indicated at $U^1$. The plunger S is formed integral with a lateral projection $S^1$ which is arranged to reciprocate in a guide rigid with the crosshead and carries a cam follower in the form of a roller V which bears upon a linear cam W extending in the direction of movement of the crosshead and against which the roller V is urged by a spring (not shown). Thus, owing to the form of the cam U the plunger S will be caused by its spring to move to the left as the engine piston moves on its outstroke until the plunger S uncovers the passage D, whereupon lubricating oil will flow into the working chamber of the pump, and during each instroke of the engine piston the plunger S will be forced to the right under the action of the cam W on the follower roller V to force lubricating oil through the passages E, E into the substantially continuously loaded area of the small end bearing T.

As will be seen in the arrangement shown, the supply passage D also communicates via a passage X with a longitudinally extending passage Y in the connecting rod $Z^1$, and this passage leads to the working clearance of the big end bearing so that the big end bearing is also lubricated by oil from the telescopic pipe U, $U^1$.

I claim:

1. A reciprocating piston mechanism which comprises a cylinder, a reciprocating piston assembly in said cylinder, an angularly oscillating connecting rod having a small end pivotally connected to said piston assembly by a small end bearing and having a big end pivotally connected to a crank by a big end bearing, a single-acting displacement-type lubricating pump carried by said piston assembly for bodily movement therewith, said pump having an inlet and an outlet and having a movable actuating member, said pump outlet communicating with said small end bearing, a walking pipe communicating at one end with a supply of lubricant and pivotally connected at its other end to said piston assembly in communication with said pump inlet to supply lubricant to the pump during each suction period thereof for delivery from said pump outlet to said small end bearing during the ensuing delivery period of the pump, and a mechanical interconnection between said walking pipe and said actuating member of said pump, which interconnection transmits the angular oscillations of the walking pipe caused by the reciprocation of the piston assembly to said actuating member of said pump to actuate said pump.

2. A reciprocating piston mechanism which includes a cylinder, a reciprocating piston assembly in the cylinder, an angularly oscillating connecting rod having a small end pivotally connected to the piston assembly by a small end bearing and having a big end pivotally connected to a crank by a big end bearing, a single-acting reciprocating lubricating pump carried by the piston assembly for bodily movement therewith, said pump having an inlet and an outlet and having a movable plunger, the pump outlet communicating with said small end bearing, a walking pipe communicating at one end with a supply of lubricant and pivotally connected at its other end to said piston assembly in communication with the pump inlet to supply lubricant to the pump during each suction period thereof for delivery to the small end bearing during the ensuing delivery period of the pump, said pump plunger being interconnected by means of a link on an adjacent end portion of said walking pipe, the interconnection being radially displaced from the axis of the said pivotal connection of said walking pipe to said piston assembly, said link transmitting angular oscillations of said walking pipe caused by the reciprocation of said piston assembly to said pump plunger to cause corresponding reciprocating movements of said plunger.